United States Patent [19]

Yoshida

[11] Patent Number: 4,729,033
[45] Date of Patent: Mar. 1, 1988

[54] DATA COMMUNICATION APPARATUS
[75] Inventor: Takehiro Yoshida, Tokyo, Japan
[73] Assignee: Canon Kabushiki Kaisha, Tokyo, Japan
[21] Appl. No.: 68,712
[22] Filed: Jun. 30, 1987

Related U.S. Application Data

[63] Continuation of Ser. No. 709,422, Mar. 7, 1985, abandoned.

[30] Foreign Application Priority Data

Mar. 13, 1984 [JP] Japan .................. 59-48581

[51] Int. Cl.⁴ .............................................. H04N 1/32
[52] U.S. Cl. ...................................... 358/257; 358/280; 375/118
[58] Field of Search ............... 358/257, 256; 353/280; 375/118

[56] References Cited

U.S. PATENT DOCUMENTS

| | | | |
|---|---|---|---|
| 3,496,293 | 2/1970 | Avery et al. | 340/346 |
| 3,914,537 | 10/1975 | Perreault et al. | 358/257 |
| 4,000,371 | 12/1976 | Ogawa | 358/257 |
| 4,079,425 | 3/1978 | Vandling | 358/257 |
| 4,153,916 | 5/1979 | Miwa et al. | 358/257 |
| 4,228,466 | 10/1980 | Vandling | 358/257 |
| 4,244,007 | 1/1981 | Vandling | 358/257 |
| 4,331,983 | 5/1982 | Burton et al. | 358/257 |
| 4,502,080 | 2/1985 | Tsuda | 358/256 |
| 4,567,322 | 1/1986 | Tsuda | 358/256 |

FOREIGN PATENT DOCUMENTS

| | | |
|---|---|---|
| 0064818 | 11/1982 | European Pat. Off. . |
| 8001025 | 5/1980 | PCT Int'l Appl. . |
| 8301359 | 4/1983 | PCT Int'l Appl. . |
| 1206639 | 9/1970 | United Kingdom . |
| 1532363 | 11/1978 | United Kingdom . |
| 1604485 | 12/1981 | United Kingdom . |
| 2081053 | 2/1982 | United Kingdom . |
| 2101457 | 1/1983 | United Kingdom . |

Primary Examiner—Edward L. Coles, Sr.
Attorney, Agent, or Firm—Fitzpatrick, Cella, Harper & Scinto

[57] ABSTRACT

A data communication apparatus includes a transmitter to transmit an initial identification signal prior to a data communication in order to set a communication procedure for this communication; a detector to detect a significant signal from an apparatus on the distant side; an arrangement for changing a transmission timing of an initial identification signal in accordance with a detection output of the detector; and a controller to set the reception mode into the polling reception mode or the ordinary manual reception mode by checking the presence or absence of the significant signal. With this apparatus, the polling reception can be completely executed for a short preparation interval without collision of the mutual initial identification signals.

12 Claims, 7 Drawing Figures

MANUAL RECEPTION
(ORDINARY RECEPTION)

MANUAL TRANSMISSION
(ORDINARY TRANSMISSION)

MANUAL RECEPTION
(POLLING RECEPTION)

AUTOMATIC RECEPTION
(POLLING TRANSMISSION)

DATA COMMUNICATION APPARATUS

This application is a continuation of application Ser. No. 709,422 filed Mar. 7, 1985 now abandoned.

BACKGROUND OF THE INVENTION

1. Field of the Invention

The present invention relates to a data communication apparatus which transmits or receives image data, code data or the like.

2. Description of the Prior Art

Hitherto, data communication apparatus of this kind, for example, facsimile apparatuses generally have been provided with an automatic reception mode whereby an original image is received without the information of an operator and a manual reception mode whereby the original image is received through operator intervention. The manual reception mode includes an ordinary manual reception mode whereby an operator is present on the transmission side and also a manual polling reception mode whereby an original set on the transmission side is automatically read on the transmission side by accesssing from the reception side to the transmission side without operator intervention on the transmission side and this read image is received on the reception side.

On one hand, a facsimile apparatus generally transmits its own communication mode as an initial identification signal to an apparatus of the called party side in order to set a common communication mode, such as the same communication procedure, communication standard or the like.

In the manual polling reception mode, initial identification signals are mutually transmitted from both of the transmission and reception sides, so that there is a case where the initial identification signals collide with each other on the line and both transmission and reception sides cannot identify the mutual initial identification signals and the polling communication is not performed. Further, there is a drawback such that even if the polling is executed, it takes a long time for the preparation since the signals collide with each other. FIG. 1 shows a typical practical example whereby in case of performing the polling between conventional facsimile apparatuses, the initial identification signals collide with each other and the polling is not executed.

In FIG. 1, various kinds of signals are signals based on the CCITT recommendation T30. A reference numeral 1 denotes a called station identification (CED) signal; 2 and 6, preambles which are transmitted prior to the transmission of a binary signal; 3 and 7, nonstandard function (NSF) signals; 4, a called terminal identification (CSI) signal; and 5 and 8, digital identification (DIS) signals. In FIG. 1, subsequent to the CED signal, the NSF, CSI and DIS signals are transmitted on the automatic reception side. Thereafter, the binary signal is received for three seconds on the same side. When signals (a nonstandard function setting (NSS) signal, a transmitting terminal identification (TSI) signal and a digital command (DCS) signal) in the group of the DCS signal are received from the facsimile apparatus on the calling party side, a training check (TCF) signal is then received and thereafter image information is received. On the other hand, when signals (a nonstandard function command (NSC) signal, a calling station identification (CIG) signal, a digital transmission command is effected. A (DTC) signal in the group of the DTC signal are received from the facsimile apparatus on the called party side, the signals in the DCS group are transmitted and thereafter the polling transmission of the image information is performed. However, as shown in FIG. 1, no binary signal is transmitted from the facsimile apparatus on the called party side when the binary signal is to be received, so that the NSF, CSI and DIS signals are transmitted after an expiration of three seconds. Thereafter, the binary signal is received for three seconds. The foregoing operation is repeated until the initial identification time (for instance, 35 seconds) elapses, and the error end is caused. On the other hand, when the operator presses a start button after becoming aware of the CED signal, the facsimile apparatus on the manual reception side starts the transmission of the initial identification signal. The facsimile apparatus on the manual reception side does not transmit the CSI signal. In this case, the NSF and DIS signals are first transmitted and thereafter the binary signal is received for 4.5 seconds. When the signals in the DCS group are received from the facsimile apparatus on the calling party side, the training check (TCS) signal is received, thereafter the image information is received. On the other hand, when the NSF signal and DIS signal (bit 9 in a facsimile information field (FIF) is 1, namely, there is a transmitting original) are received from the facsimile apparatus on the calling party side (the CSI signal may not be received), the signals in the DTC group are transmitted and thereafter the (polling reception of the image information is performed. However, as shown in FIG. 1, the binary signal subsequent to the preamble is not transmitted from the facsimile apparatus on the calling party side when the binary signal is to be received; consequently, the NSF, CSI and DIS signals are transmitted after an expiration of 4.5 seconds. Thereafter, the binary signal is received for 4.5 seconds. The foregoing operation is repeated until the initial identification time (e.g., 35 second) elapses, and the error end is caused. In the foregoing embodiment, it has been considered the case where the relation of $\alpha = \beta + 1.5$ is satisfied when it is assumed that the time of the initial identification signal which is transmitted from the automatic reception side (the time from the start of transmission of the preamble signal until the end of the DIS signal) is $\alpha$ (seconds.) and the time of the initial identification signal which is transmitted from the manual reception side (the time from the start of transmission of the preamble signal until the end of the DIS signal) is $\beta$ (seconds). Although the case where $\alpha = \beta + 1.5$ is satisfied does not practically occur so frequently, $\alpha > \beta$ could occur. Further, in case of the facsimile apparatus having the functions based on the CCITT Recommendation T2 and T3, a ternary signal is transmitted prior to the binary signal, so that the execution of the polling operation becomes more difficult than the case where only the binary signal is transmitted.

On the other hand, in the case where the facsimile apparatus on the calling side is in the manual transmission mode, namely, in case of the ordinary manual reception mode, the transmission side does not transmit any signal until the signals in the DIS group which are transmitted from the facsimile apparatus on the manual reception side are received and after the DIS signals were received, the transmission side transmits the signals in the DCS GROUP. Therefore, the collision of the initial identification signals as in the polling operation does not occur and the ordinary image transmission is executed.

SUMMARY OF THE INVENTION

It is an object of the present invention to provide a data communication apparatus which can reduce the time required for the communication preparation and can promptly perform the data communication in consideration of the foregoing drawbacks in the conventional technology.

It is another object of the invention to provide a data communication apparatus in which the initial identification signals do not collide with each other.

Still another object of the invention is to provide a data communication apparatus in which in case of the manual reception mode, the presence or absence of a significant signal from the transmission side is checked, thereby enabling the mode between the polling reception mode and the ordinary manual reception mode to be discriminated.

Still another object of the invention is to provide a data communication apparatus in which in case of the reception mode, the transmission timing of the initial discrimination signal is changed in dependence upon the presence or absence of the significant signal from the transmission side.

According to the present invention, the polling reception can be completely executed for a short preparation interval.

Other objects and features of the present invention will be more apparent from the following detailed description in conjunction with the accompanying drawings.

DETAILED DESCRIPTION OF THE PREFERRED EMBODIMENTS

Figure 1:
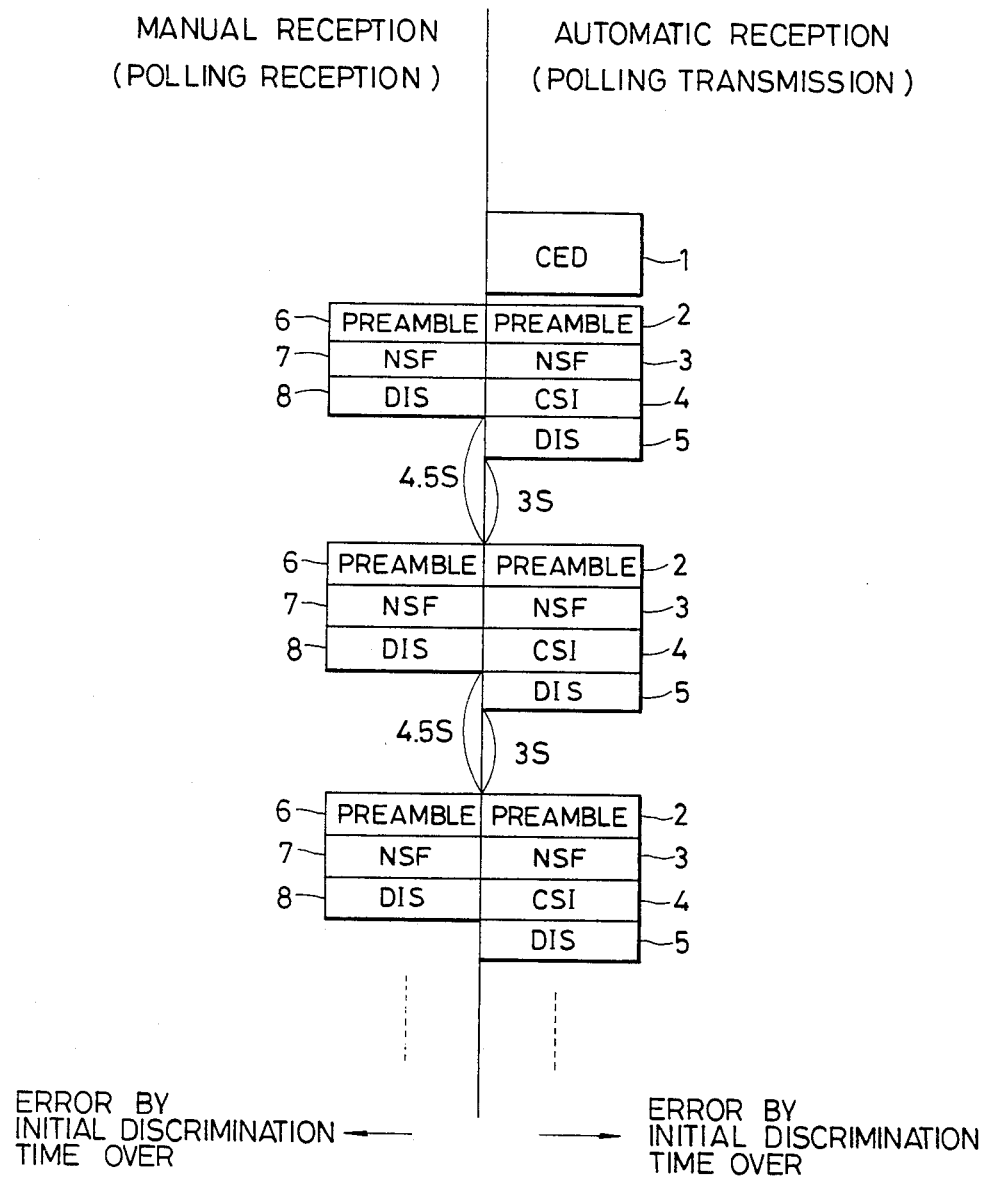
FIG. 1 is an explanatory diagram showing an example of the procedure in a conventional facsimile apparatus.

The content of the present invention will now be described in detail hereinbelow with respect to an embodiment shown in the drawings.

Figure 2:
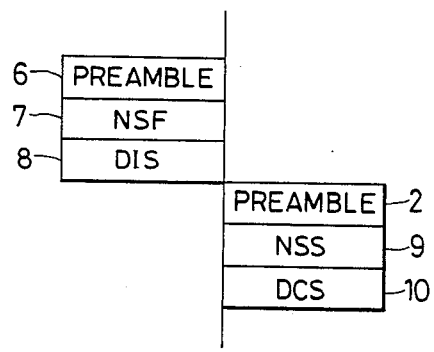
FIGS. 2 and 3 are explanatory diagrams showing an example of the procedure in a facsimile apparatus according to the present invention.
Figure 3:
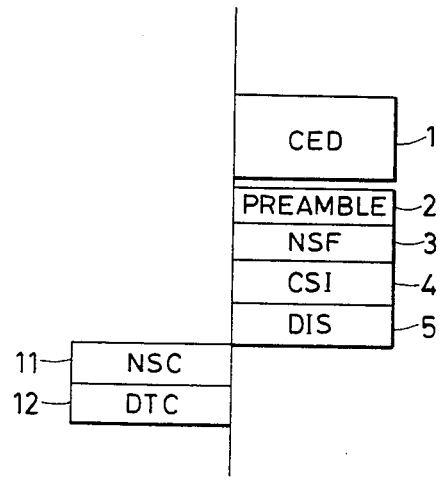

FIGS. 2 and 3 show an example whereby the manual receiving operation is performed using a facsimile apparatus according to the present invention. FIG. 2 shows the case of the ordinary manual reception mode whereby a facsimile apparatus on the distant side performs the manual transmission. In FIG. 2, reference numerals 2, 6, 7 and 8 denote the same components as those shown in FIG. 1. A numeral 9 is a nonstandard function setting (NSS) signal and 10 is a digital commond (DCS) signal. FIG. 3 shows the case of the manual polling reception mode whereby the facsimile apparatus on the distant side is set into the automatic reception mode and executes the polling transmission. In FIG. 3, numerals 1, 2, 3, 4 and 5 represent the same components as those shown in FIG. 1. A numeral 11 indicates a nonstandard function command (NSC) signal and 12 is a digital transmission command (DTC) signal.

Figure 4:
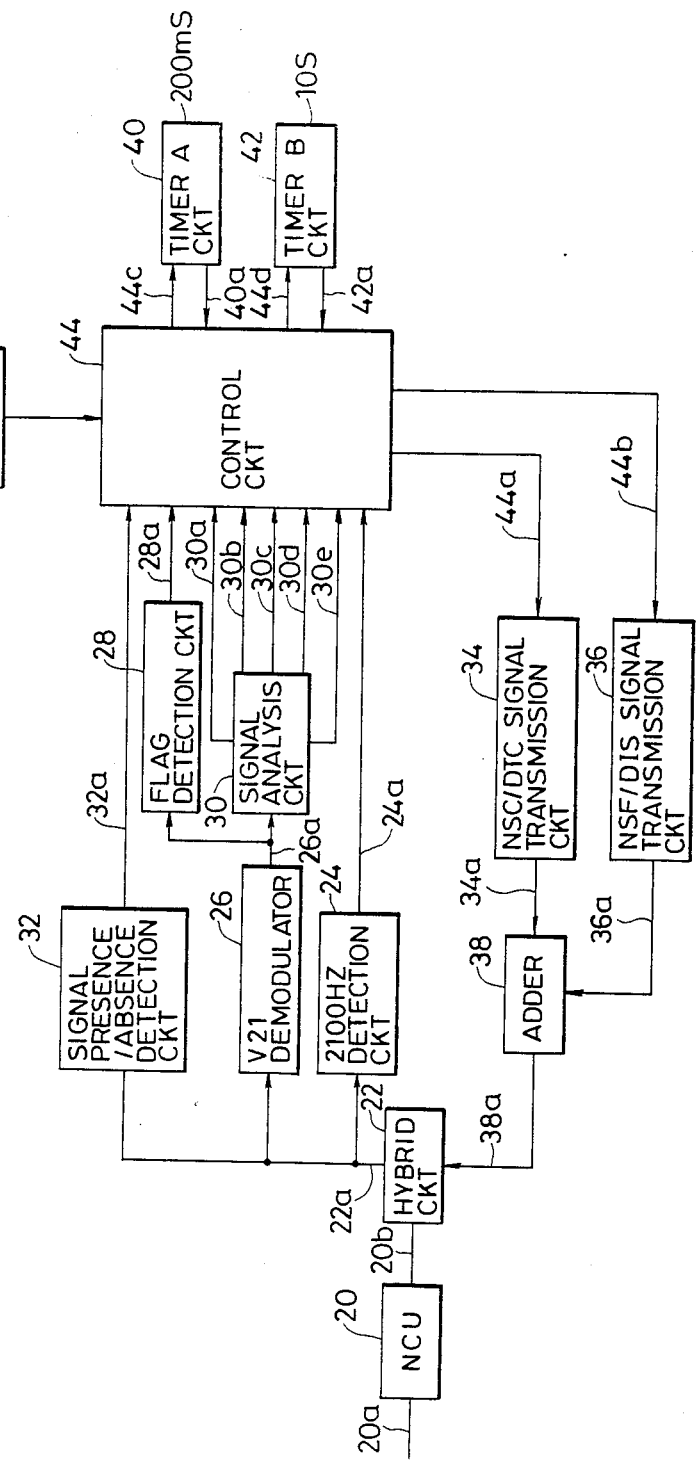
FIG. 4 is a control block diagram of the facsimile apparatus of an embodiment.

FIG. 4 shows a block diagram of an embodiment of a facsimile apparatus according to the invention.

In FIG. 4, a numeral 20 denotes a network control unit NCU. In order to use a telephone network for data transmission or the like, the NCU 20 performs the connection control of the telephone exchange network by connecting the telephone network to terminals of the telephone line or performs the switching to a data communication path (data channel) or holds the loop. A signal line 20a is a telephone line.

A hybrid circuit 22 separates a signal to be transmitted and a signal to be received. The transmission signal is transmitted from a signal line 38a through a signal line 20b onto the telephone line 20a. On the contrary, the reception signal is outputted from the telephone line 20a through the signal line 20b onto a signal line 22a.

A numeral 24 is a 2100 Hz detection circuit which inputs the signal on the signal line 22a and outputs a signal at a signal level of "1" onto a signal line 24a when the signal of 2100 Hz is detected and outputs a signal at a signal level of "0" onto the signal line 24a when the 2100 Hz signal is not detected.

A demodulator 26 inputs the signal on the signal line 22a and outputs the result of which this signal was demodulated due to the V21 MODEM onto a signal line 26a.

A flag detection circuit 28 receives the binarized binary signal which was outputted onto the signal line 26a and generates a pulse onto a signal line 28a when it detects a two-byte sequential flag pattern, namely, a pattern of "0111111001111110".

A signal analysis circuit 30 receives the binarized binary signal which was outputted onto the signal line 26a and generates a pulse onto a signal line 30a when it detects a significant signal. The signal analysis circuit 30 generates a pulse onto a signal line 30b when it detects the NSF signal; generates a pulse onto a signal line 30c when it detects the CSI signal; and generates a pulse onto a signal line 30d when it detects the DIS signal. Whenever the DIS signal is detected, the signal analysis circuit 30 outputs the information of the ninth bit in the FIF of the DIS signal (information representative of the presence or absence of the original) onto a signal line 30e.

A signal presence/absence detection circuit 32 inputs the signal which was outputted onto the signal line 22a and detects the presence or absence of the signal. The signal presence/absence detection circuit 32 outputs a signal at a signal level of "1" onto a signal line 32a when the signal is present (namely, the signal over −43 dBm has reached the receiver) and outputs a signal at a signal level of "0" onto the signal line 32a when the signal is absent (namely, the signal below −48 dBm has reached the receiver).

An NSC/DTC transmission circuit 34 transmits the NSC/DTC signals onto a signal line 34a when a pulse is generated onto a signal line 44a (there is also a case of the NSC/CIG/DTC signals and these three kinds of signals are referred to as "initial identification signals representative of the transmission commands" in this specification).

An NSF/DTC transmission circuit 36 transmits the NSF/DIS signals onto a signal line 36a when a pulse is generated onto a signal line 44b (there is also a case of the NSF/CSI/DIS signals and these three kinds of signals are referred to as "ordinary initial identification signals" in this specification).

An adder 38 inputs the signal on the signal line 34a and the signal on the signal line 36a and outputs the result of an addition operation onto the signal line 38a.

A start button 39 is pressed by an operator to instruct the start of the manual communicating operation.

A timer-A circuit 40 generates a pulse onto a signal line 40a after an expiration of 200-msec after a pulse was outputted onto a signal line 44c.

A timer-B circuit 42 generates a pulse onto a signal line 42a after an expiration of ten seconds after a pulse was outputted onto a signal line 44d.

A control circuit 44 performs the following controls mentioned below and is constituted by a CPU, a ROM, a RAM etc.

When the start button 39 is pressed and the manual reception mode is instructed, a check is made for a constant time to see if the signal which is transmitted from the facsimile apparatus on the transmission side is present or absent. The reception side does not transmit the initial identification signal for this interval. Therefore, the signal from the transmission side can be completely received. Unless the significant signal is received during this constant interval, the "ordinary initial identification signals" (NSF and DIS signals in this embodiment) are transmitted as shown in FIG. 2 and the apparatus advances into the ordinary manual reception mode.

On the contrary, when the significant signal is detected on the reception side for the foregoing constant interval, the signals in the DIS group (the NSF, CSI and DIS signals in this embodiment) from the transmission side are received as shown in FIG. 3 and thereafter the "initial identification signals representative of the transmission commands" (NSC and DTC signals) are transmitted.

Figure 5:
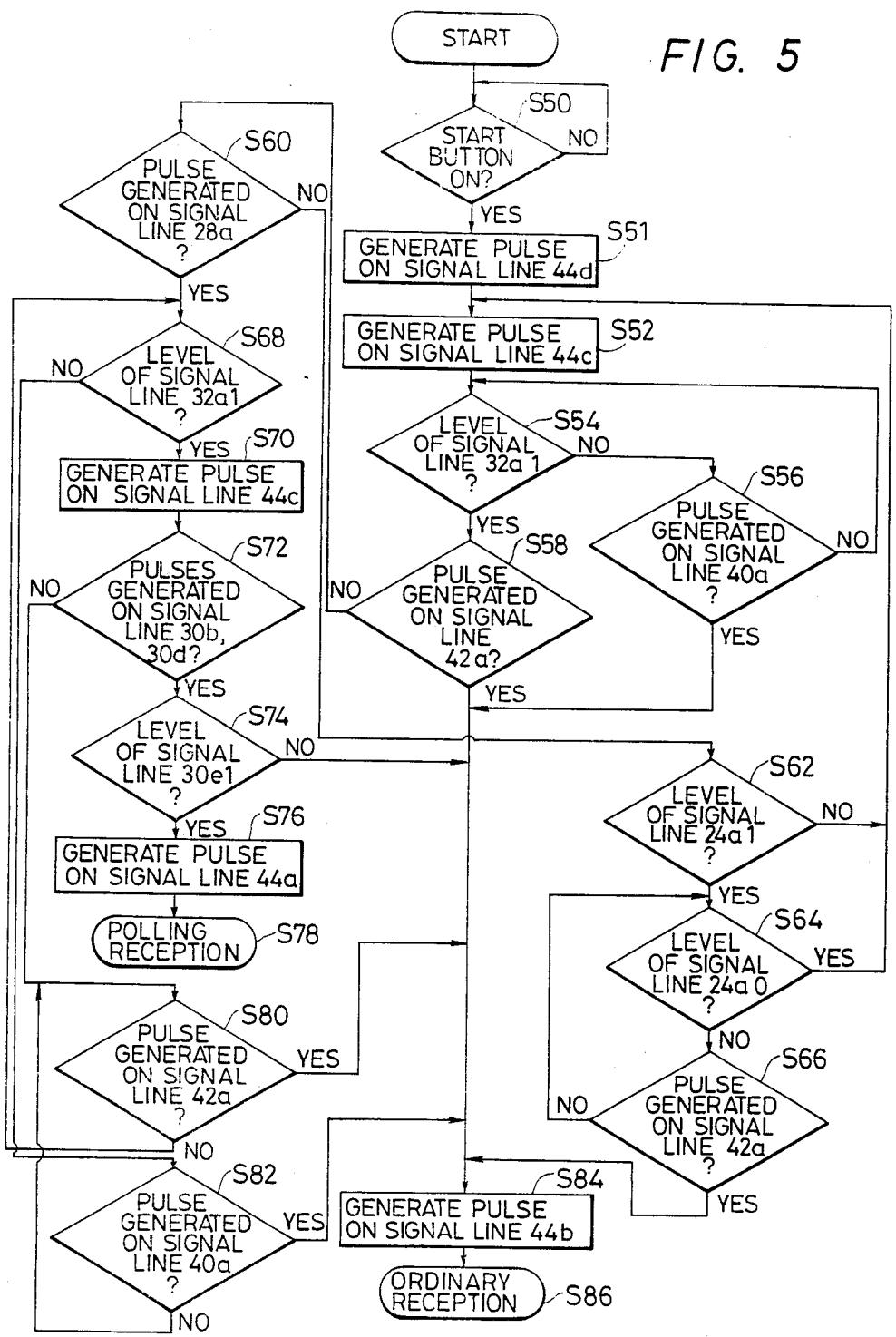
FIG. 5 is a flowchart showing the control procedure of a control circuit 44 shown in FIG. 4.

FIG. 5 shows a flowchart for the control of the control circuit 44 in FIG. 4. The above-mentioned operation will then be described in detail with reference to FIG. 5.

When the start button 39 is pressed and the manual reception mode is selected, the process routine advances to step S51.

In step S51, a pulse is generated onto the signal line 44d, thereby starting the 10-sec timer.

Next, in step S52, a pulse is generated onto the signal line 44c, thereby starting the 200-msec timer.

In step S54, a check is made to see if the level of the signal on the signal line 32a is "1" or not, namely, the significant signal from the transmission side is present or absent. When the significant signal is present, step S58 follows. when the significant signal is absent, step S56 follows.

In step S56, a check is made to see if a pulse is generated onto the signal line 40a or not, namely, if the 200-msec timer beocmes time-over or not. In the case where the significant signal is not detected and the 200-msec timer elapses, step S84 follows and the NSF and DIS signals are transmitted, then the apparatus advances to the ordinary manual reception mode (S86). On the contrary, when the significant signal is detected in step S54, step S58 follows.

In step S58, a check is made to see if a pulse is generated onto the signal line 42a or not, namely, if the 10-sec timer elapses or not. When the 10-sec timer elapses, step S84 follows and the apparatus enters the ordinary manual reception mode. In the case where no pulse is generated onto the signal line 42a, namely, when the 10-sec timer does not elapses, step S60 follows.

In step S60, a check is made to see if a pulse is generated onto the signal line 28a or not, namely, if the continuous flag is detected or not. That is, when the continuous flag pattern (preamble) is detected, step S68 follows. On the other hand, when the continuous flag pattern is not detected, step S62 follows.

In step S62, a check is made to see if the level of the signal on the signal line 24a is "1" or not, namely, if the CED signal of 2100 Hz is detected or not When the signal of 2100 Hz is detected, step S64 follows. When the level of the signal on the signal line 24a is "0", namely, when the 2100 Hz signal is not detected, step S52 follows.

In step S64, a check is made to see if the level of the signal on the signal line 24a is "0" or not, namely, if the 2100 Hz signal is not detected. When the signal level of the signal line 24a changes from "1" to "0", step S52 follows. When the signal level of the signal line 24a is "1", step S66 follows.

In step S66, a check is made to see if a pulse is generated onto the signal line 42a or not, namely, if the 10-sec timer elapses or not. In the case where a pulse is generated onto the signal line 42a and the 10-sec timer elapses before the detection output of 2100 Hz becomes "0", step S84 follows. In step S84, the NSF and DTC signals are transmitted and the apparatus advances into the ordinary manual reception mode.

On the contrary, when the preamble is detected in step S60, a check is made in step S68 to see if the signal level of the signal line 32a is "1" or not, namely, if the significant signal is present or not. When the significant signal is detected, step S70 follows. On the other hand, when the signal level of the signal line 32a is "0", namely, when the significant signal is not detected, step S82 follows.

In step S70, a pulse is generated onto the signal line 44c, thereby starting the 200-msec timer.

In step S72, a check is made to see if pulses are generated onto the signal lines 30b and 30d or not, namely, if the NSF and DIS signals are received or not. when the NSF and DIS signals are received, step S74 follows. On the other hand, when the NSF and DIS signals are not received, step S80 follows.

In step S74, a check is made to see if the signal level of the signal line 30e is "1" or not, namely, if the ninth bit in the FIF of the DIS signal is "1" or not. When the bit 9 in the FIF of the DIS signal is "1", namely, when the original is set on the transmission side, step S76 follows and a pulse is generated onto the signal line 44a, namely, the NSC/DTC signals are transmitted.

In step S78, the apparatus enters the manual polling reception operation mode.

On the contrary, when it is determined in step S74 that no original is set on the transmission side, step S84 follows and the apparatus advances into the ordinary reception mode. In this case, since no original is set on the transmission side, the communication line may be released to finish the communication.

In step S80, a check is made to see if a pulse is generated onto the signal line 42a or not, namely, if the 10-sec timer elapses or not. When the 10-sec timer elapses, step S84 follows. When the 10-sec timer does not elapse, step S68 follows and the detection of the NSF and DIS signals is continued.

In step S82, a check is made to see if a pulse is generated onto the signal line 401 or not, namely, if the 200- msec timer elapses or not. When the 200-msec timer elapses, step S84 follows. On the contrary, when the 200-msec timer does not elapse, step S80 follows.

In step S84, a pulse is generated onto the signal line 44b, namely, the NSF/DIS signals are transmitted.

Step S86 denotes that the apparatus advances into the ordinary manual reception mode.

In the foregoing embodiment, a check is made to see if the signal is present or absent. In the case where the signal over −43 dBm is received, it is determined that the signal is present. In the case where the signal below −48 dBm is received, it is determined that the signal is absent. However, it is also possible to check the received signal to see if it has the sequential frequency or not in consideration of the background noise or the like, thereby to discriminate the presence or absence of the signal. Practically speaking, when the frequency of the received signal is not sequential even if the signal over −43 dBm is received, it is determined that the signal is absent.

An example whereby the start button 39 is used for both of the manual transmission mode and the manual reception mode will then be explained with reference to a block diagram of FIG. 6 and a flowchart of FIG. 7.

Figure 6:
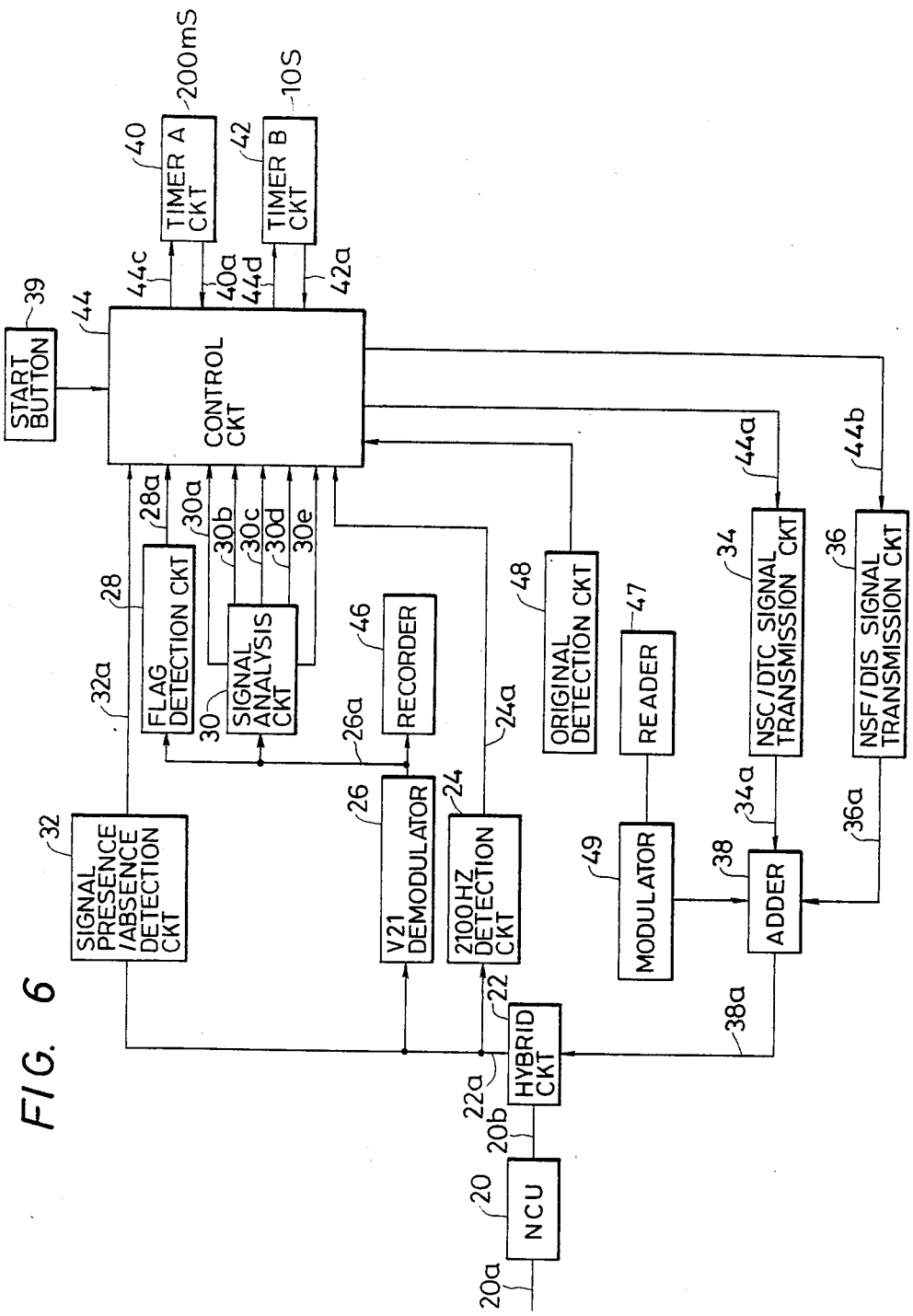
FIG. 6 is a control block diagram of a facsimile apparatus of another embodiment.
Figure 7:
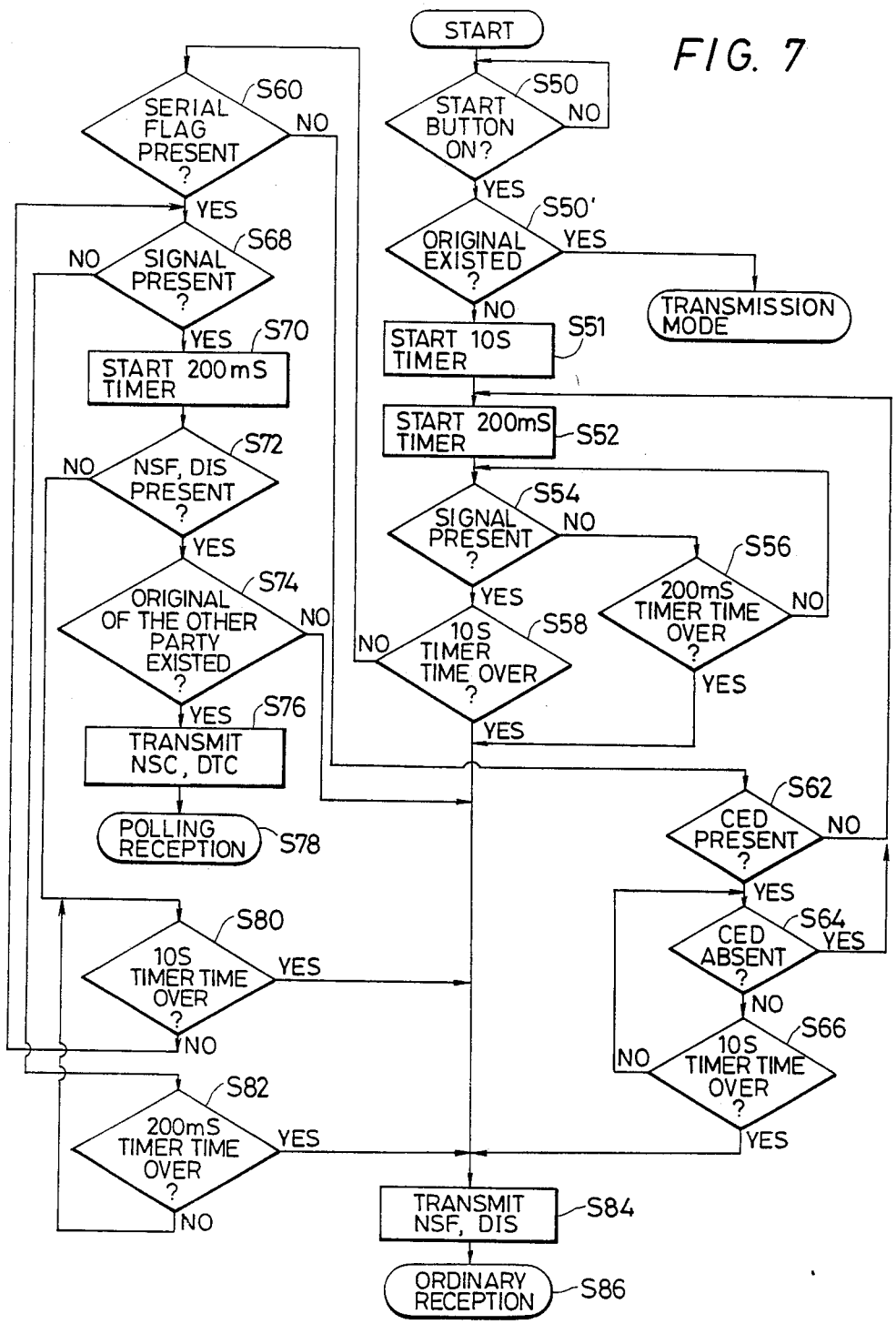
FIG. 7 is a flowchart showing the control procedure of the control circuit 44 in FIG. 6.

In FIG. 6, the parts and components having the similar functions as those shown in FIG. 4 are designated by the same reference numerals. A recorder 46 records the demodulated image signal from the demodulator 26 on a recording paper. A reader 47 reads an image of the original and obtains a binarized image signal. An original detection circuit 48 detects the original to see if it is set at the read standby position of the reader 47 or not. A modulator 49 modulates the binary image signal.

In the transmission mode, the binary image signal which was read by the reader 47 is modulated by the modulator 49 and this modulated signal is outputted onto the telephone line 20a through the adder 38, hybrid circuit 22 and NCU 20.

On the other hand, in the reception mode, the image signal which is inputted to the demodulator 26 through the NCU 20 and hybrid circuit 22 is recorded by the recorder 46.

The operation in the foregoing arrangement will then be explained with reference to the flowchart of FIG. 7.

In step S50, in a similar manner as the case of FIG. 5, the turn-on of the start button 39 is detected and when it is turned on, an output of the original detection circuit 48 is checked in step S50' to see if the original exists at the read standby position or not. When the original exists, the apparatus advances into the transmission mode and the original image is transmitted.

On the other hand, when no original is set, it is determined that the apparatus is in the manual reception mode and step S51 follows. the operations in steps S51 to S86 are substantially the same as those in steps S51 to S86 in FIG. 5; therefore, their descriptions are omitted.

As described above, according to the present invention, in case of performing the polling reception as well as the ordinary manual receiving operation, the collision of the signals as in the conventional apparatus does not occur and the first initial identification signal which is transmitted from the apparatus on the distant side can be recognized, thereby making it possible to promptly transmit the initial identification signal indicative of the transmission command after recognition. In addition, the manual ordinary reception and polling reception can be executed by a single button without providing a button only for use of the request for the polling.

As described above, in the foregoing embodiments, the facsimile apparatus which performs the transmission and reception of the image has been explained as an example. However, the invention can be also obviously applied to other data communication apparatuses which perform the transmission and reception of sentence code.

The present invention is not limited to the foregoing embodiments but many modifications and variations are possible within the spirit and scope of the appended claims of the invention.

What is claimed is:

1. A data communication apparatus in operational relationship with a least one data communication partner apparatus, comprising:
    first transmission means for transmitting an instruction signal to instruct a data communication partner apparatus to transmit data;
    second transmission means for transmitting a status signal to said data communication partner apparatus, the status signal representing that said data communication partner apparatus is in a data receptible state;
    detection means for detecting a data-presence signal provided by said data communication partner apparatus; and
    control means for initiating operation of said first transmission means when said detection means detects the data-presence signal from said data communication partner apparatus the data-presence signal representing that data to be transmitted is present in said data communication partner apparatus, and initiating operation of said second transmission means to operate when said detection means does not detect the data-presence signal within a predetermined time.

2. A data communication apparatus according to claim 1, wherein the data communication includes image data.

3. A data communication apparatus according to claim 2, wherein said data communication partner comprising a document reader and the data presence signal includes a signal which represents that an original document is placed on said document reader.

4. A data communication apparatus according to claim 1, further comprising single manual input means for initiating operation of said control means.

5. A data communication apparatus in operational relationship with at least one data communication partner apparatus, comprising:
    first transmission means for transmitting an instruction signal to a data communication partner apparatus such that said communication partner apparatus transmits data;
    second transmission means for transmitting a status signal to said data communication partner apparatus, the status signal representing that said communication apparatus is in a data receptible state;
    detection means for detecting a predetermined signal from said data communication partner apparatus and generating a detection output signal;
    control means for allowing one of said first or second transmission means to operate in accordance with the detection output signal; and
    single manual input means for initiating operation of said detection means and said control means.

6. A data communication apparatus according to claim 5, wherein the predetermined signal includes a data-presence signal which represents that the data to be transmitted is present in said data communication partner apparatus.

7. A data communication apparatus according to claim 6, wherein said control means initiates operation of said first transmission means when said detection means does not detect the data-presence signal within a predetermined time.

8. A data communication apparatus according to claim 6, wherein said control means initiates operation of said second transmission means when said detection means does not detect the data-presence signal within a predetermined time.

9. A data communication apparatus according to claim 5, wherein the data communication includes image data.

10. A data communication apparatus according to claim 9, wherein said data communication partner apparatus comprises a document reader and the data-presence signal includes a signal which represents that an original document is placed on said document reader.

11. A facsimile apparatus in operational relationship with at least one data communication partner appratus, comprisng:

manual input means for initiating an operation of said facsimile apparatus;

detection means for detecting an index signal from a data communication partner apparatus which represents that an original document to be transmitted is present in said data communication partner apparatus, said detection means initiating operation in response to a start operation of said manual input means;

first transmission means, responsive to a detection output of said detection means, for transmitting to said data communication partner apparatus an instruction signal to instruct said data communication partner apparatus to transmit original image data; and second transmission means for transmitting a signal representing that said facsimile apparatus is in an image data receptible mode, when said detection signal does not detect the index signal.

12. A facsimile apparatus according to claim 11, further comprising second detection means for detecting whether or not the original document is present in said facsimile apparatus, and wherein when said second detection means detects that the original document is present in said facsimile apparatus a transmission mode is set during operation of said manual input means.

* * * * *

UNITED STATES PATENT AND TRADEMARK OFFICE
CERTIFICATE OF CORRECTION

PATENT NO. : 4,729,033

DATED : March 1, 1988

INVENTOR(S) : TAKEHIRO YOSHIDA

It is certified that error appears in the above-identified patent and that said Letters Patent is hereby corrected as shown below:

COLUMN 1

Line 13, "apparatus" should read --apparatuses--.
    Line 16, "information" should read --intervention--.
    Line 66, "signal," should read --signal or the like) are received,--.

COLUMN 2

Line 29, "(polling" should read --polling--.
    Line 38, "35 second)" should read --35 seconds)--.
    Line 65, "DCSGROUP." should read --DCS group.--.

COLUMN 3

Line 63, "mond" should read --mand--.

COLUMN 5

Line 53, "when" should read --When--.
    Line 57, "beocmes time-over" should read --elapses--.

COLUMN 6

Line 2, "elapses," should read --elapse,--.
    Line 42, "when" should read --When--.
    Line 68, "signal line 401" should read --signal line 40a--.

COLUMN 7

Line 54, "the" should read --The--.

UNITED STATES PATENT AND TRADEMARK OFFICE
CERTIFICATE OF CORRECTION

PATENT NO. : 4,729,033

DATED : March 1, 1988

INVENTOR(S) : TAKEHIRO YOSHIDA

It is certified that error appears in the above-identified patent and that said Letters Patent is hereby corrected as shown below:

COLUMN 8

Line 30, "apparatus the" should read --apparatus, the--.
    Lines 41-42, "comprising" should read --comprises--.
    Line 42, "data presence" should read --data-presence--.

COLUMN 9

Line 25, "appratus," should read --apparatus,--.

COLUMN 10

Line 19, "signal" should read --means--.

Signed and Sealed this

Thirteenth Day of September, 1988

Attest:

DONALD J. QUIGG

*Attesting Officer*      *Commissioner of Patents and Trademarks*